Nov. 9, 1965    W. J. C. TRYTHALL    3,216,094
METHOD OF INSERTING VALVES IN PIPELINES
Filed Nov. 28, 1962    4 Sheets-Sheet 2

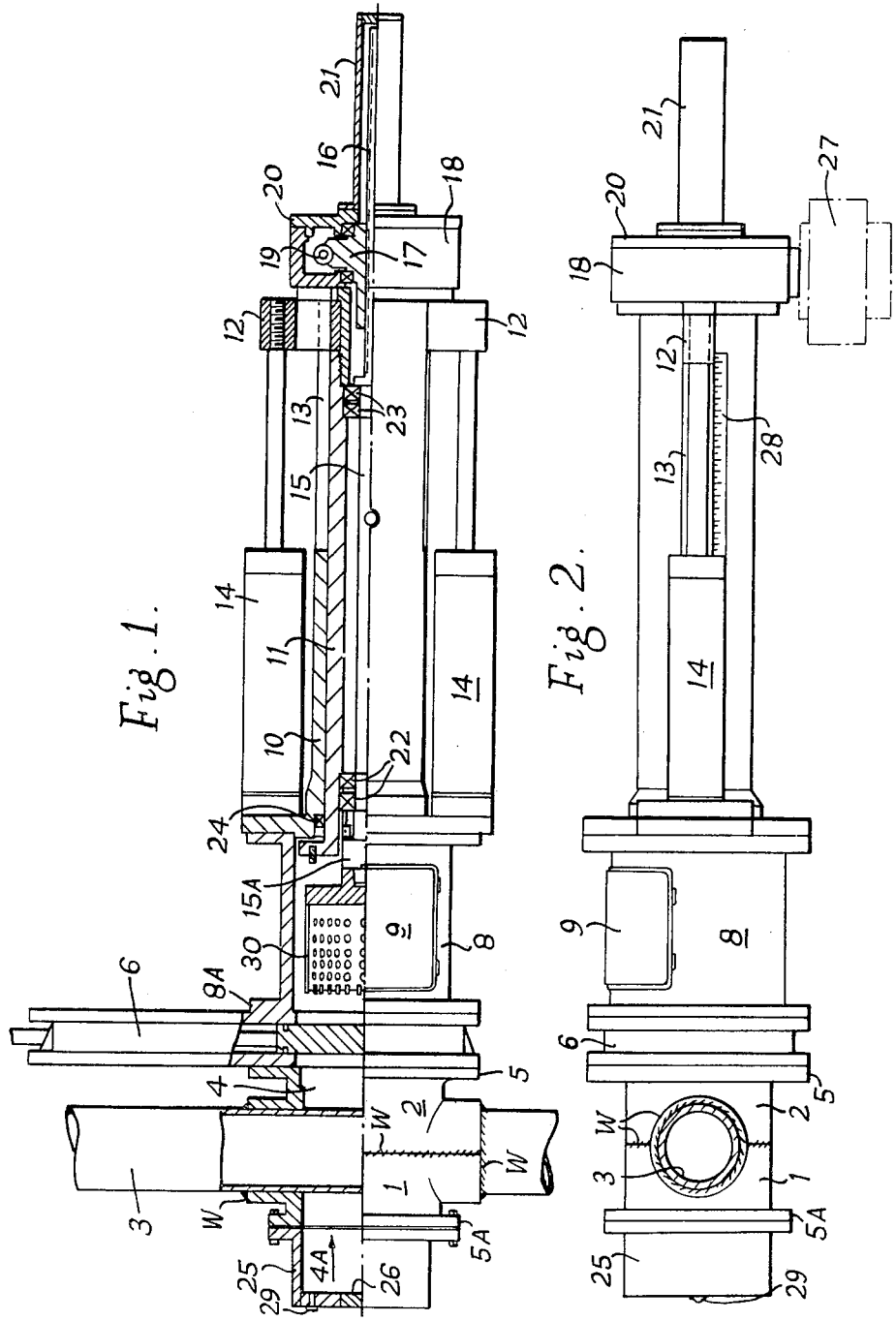

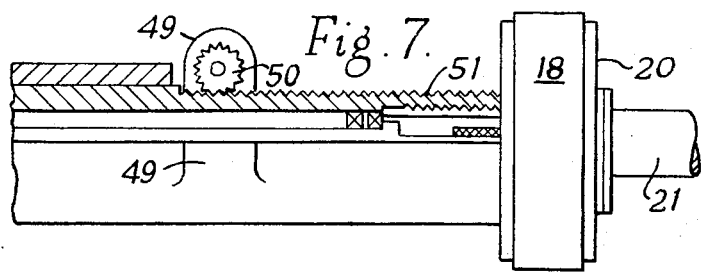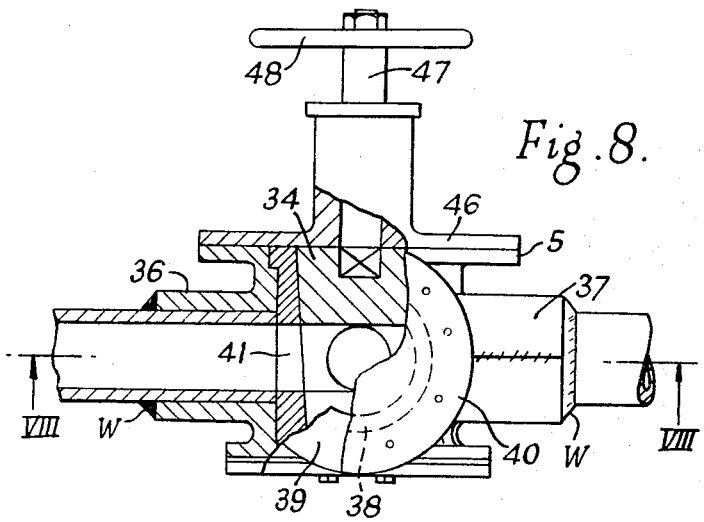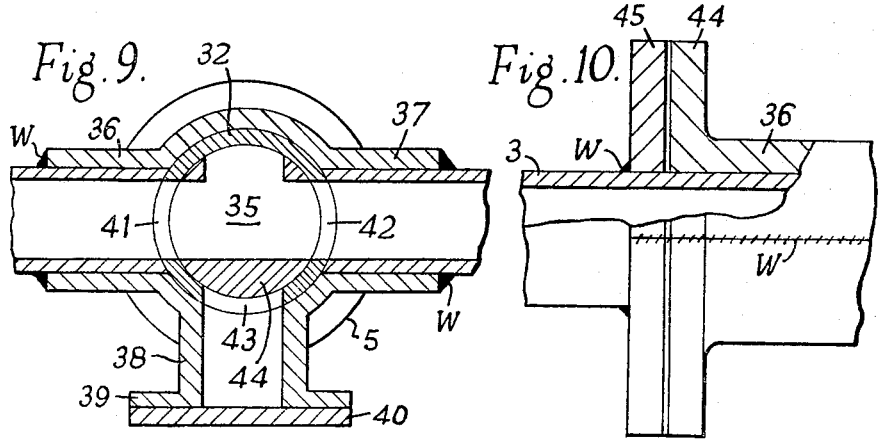

United States Patent Office 3,216,094
Patented Nov. 9, 1965

3,216,094
METHOD OF INSERTING VALVES
IN PIPELINES
William John Courtney Trythall, 16 Cumberland Place,
Southampton, England
Filed Nov. 28, 1962, Ser. No. 240,591
Claims priority, application Great Britain, Dec. 1, 1961,
43,039/61
8 Claims. (Cl. 29—157.1)

This invention relates to a method of inserting valve assemblies into pipelines.

In industrial processes, for example petroleum refineries, chemical plants and similar industries, wherein pipelines are intended to be in continuous use, any expansion or alteration of a pipe system that involves a shut down of the normal flow of a product through a pipe can cause the plant to operate at a reduced efficiency or, in certain instances, may necessitate a complete shut down of the plant. The more complex the plant, the more costly does a shut down become.

Such expansion or alterations often involve the addition of a flow control valve in a pipeline at a point intermediate its ends, for example a through-way valve or a three-way valve, and it is an object of the present invention to provide a method of installing such valve assemblies for use in such instances.

It is a further object of the invention to provide a method of installing such flow control valves in a pipeline that is actually "on stream" without stopping the flow of the product passing through it or reducing the pressure therein.

It is a further object of the invention to provide a method of installing such flow control valves in a pipeline that is actually "on stream" such that said flow control valves can, if required, be subsequently cut away in a manner leaving a flanged coupling end on each cut end of the pipeline.

The method according to the present invention comprises applying a housing about a pipeline in a liquid tight manner, rotating a shaft to rotate a cutting tool within the housing so as to cut out opposite faces of the pipeline or one or more complete sections of said pipeline, withdrawing the shaft and cutting tool from the housing past a slide valve on the housing and into a pressure tight chamber secured to said housing, closing the slide valve to isolate the housing from the pressure tight chamber, removing the cutting tool from its operating shaft, placing a ported valve sleeve on said shaft such that two opposed ports in the valve sleeve are opposed in a direction that is parallel with the direction of liquid flow in the pipeline, opening the slide valve between the housing and the pressure tight chamber, using the shaft to force the valve sleeve past the slide valve and into the pipeline so as to extend thereacross and occupy the opposed cut away portions or the cut away section of the pipeline with the ports in the valve sleeve aligned with the bore of the pipeline, withdrawing the shaft into the pressure tight chamber whilst leaving the valve sleeve in position in the pipeline, closing the slide valve to isolate the housing from the pressure tight chamber, applying a valve member to the shaft, opening the slide valve between the pressure tight chamber and the housing and then operating said shaft to move the valve member past said slide valve and into the valve sleeve to seal the pipeline from the housing with the valve in a setting allowing fluid flow through said pipeline, causing a valve holding means to co-operate with the valve member in a manner temporarily holding it against removal from the valve sleeve, removing the pressure tight chamber and the slide valve from the housing, securing a valve control device to the housing for operating the valve member, and then releasing said valve holding means.

Preferably, the above method also includes the additional step of sizing the cut portions of the pipe with a sizing cutter prior to the insertion of the valve sleeve.

The above method may include the step of opening a door to the pressure tight chamber each time access is to be made to said operating shaft therein for the purpose of removing a cutting or sizing tool therefrom, or for applying a valve sleeve or valve member thereto, the slide valve member being closed each time before said door is opened.

In an alternative method, the pressure tight chamber is temporarily removed from said slide valve member each time access is to be made to said operating shaft in the pressure tight chamber for the purpose of removing a cutting or sizing tool therefrom, or for applying a valve sleeve or valve member thereto, the slide valve member being closed each time before said pressure tight housing is removed.

In order that the invention may be clearly understood reference will now be made to the accompanying diagrammatic drawings, in which:

FIG. 1 is a view, partly in section, showing a vertically disposed pipeline within a liquid tight housing, and apparatus secured to said housing for operating a cutting tool on a shaft for cutting away opposed portions of said pipeline;

FIG. 2 is a side elevation of FIG. 1;

FIG. 7 is a fragmentary view showing alternative means for axially displacing the shaft of the apparatus secured to the housing;

FIG. 8 is a side elevation, partly in section, of a three-way valve assembly according to the present invention, fitted onto a horizontal pipeline;

FIG. 9 is a cross-section through FIG. 8 taken along the line VIII and looking in the direction of the arrows; and FIG. 10 is a side elevation, partly in cross section, of a modified form of valve housing for assembly about a pipeline.

Figure 3:
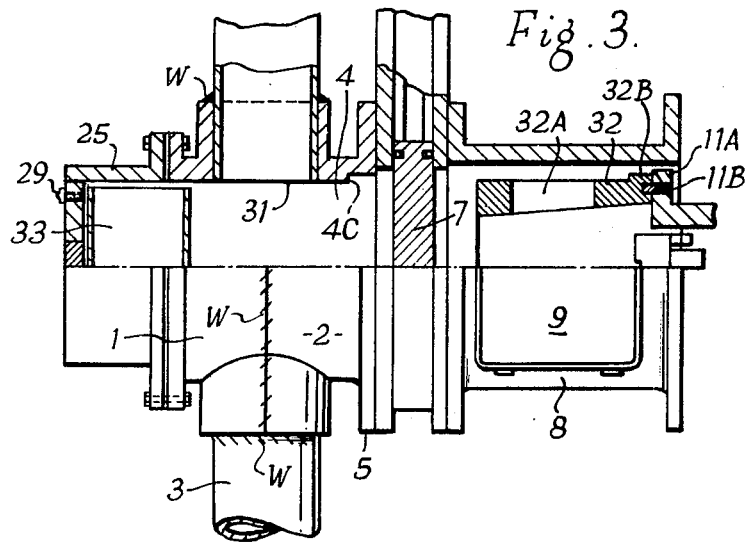
FIG. 3 is a sectional view of part of FIG. 1 showing the apparatus on the housing ready for inserting a valve sleeve into the cut away portions of the pipeline, and with the cut away material in a detachable portion of the housing.

Referring now to FIGS. 1 and 2 it will be seen that a housing has been formed from two side parts 1 and 2 disposed on opposite sides of a pipeline 3, said parts 1 and 2 having been welded to each other as well as to the pipeline 3 along weld lines W so as to form a liquid tight housing therearound except for an opening 4 in the side face of the part 2, said opening 4 terminating in an outwardly directed flange 5, and an opening 4A in the side face of the part 1, said opening 4A terminating in an outwardly directed flange 5A.

The flanged openings 4 and 4A are thus coaxially disposed on opposite sides of the pipeline 3.

Bolted to the outwardly directed flange 5 is a slide valve housing 6 in which is a slide valve 7 capable of sealing off the opening 4. Permanently or detachably secured to the opposite side of the slide valve housing 6 is a pressure tight housing 8, access to which is possible through a pressure tight door 9 secured to one side face thereof.

Permanently or detachably secured to the pressure tight housing 8, at the end opposite to the end secured to the slide valve housing 6, is an elongated member 10 in which is mounted an axially displaceable sleeve 11. The sleeve 11, at its end remote from the pressure tight housing 8, carries two radially extending arms 12 that project from the sleeve 11, on opposite sides thereof, through opposed elongated slots 13 formed in the elongated member 10. The end of the elongated member 10 that is secured to the pressure tight housing 8 has rigidly secured thereto a pair of diametrically opposed cylinders 14, the longitudinal axis of these cylinders being parallel with the longitudinal axis of the axially displaceable sleeve 11. Within each cylinder 14 is a piston, said piston being coupled through its piston shaft to the radially extending arms 12.

Mounted within the axially displaceable sleeve 11 is a rotatable shaft 15, said shaft being axially displaceable with the displaceable sleeve 11. The rotatable shaft 15 has or is keyed to an extension 16 that is slidably keyed within a surrounding worm wheel 17. The worm wheel 17 is rotatably mounted within a housing 18, the housing 18 being integrally or removably secured to the end of the elongated member 10. Rotatably mounted within the housing 18 is a worm 19 meshing with the worm wheel 17. The housing 18 is closed by a centrally apertured cover 20 and this cover 20 has an elongated tubular extension 21 integrally or removably secured thereto, the elongated tubular extension 21 being coaxial with the axis of the shaft 15. When the shaft 15 is in its extreme right hand position as shown in FIG. 1 it extends into the tubular extension 21.

Sealing and bearing members 22 are positioned between the left hand end of the shaft 15 and the axially displaceable sleeve 11. Further sealing and bearing means 23 are disposed between the right hand end of the shaft 15 and the axially displaceable sleeve 11. Sealing and bearing means 24 are also included between the left hand end of the axially displaceable sleeve 11 and the elongated member 10.

Bolted to the flange 5A of the part 1 of the housing is a detachable housing portion 25, this housing portion being capable of accommodating a cut away section of the pipeline 3 and, in addition, said detachable housing may include a pressure tight inspection glass 26 and a bleed valve 29. The inspection glass 26 and the bleed valve 29 are, however, not essential to the present invention and may be omitted.

As shown in FIG. 2 a housing 27 may be secured to the housing 18 for the worm wheel. This housing 27 encloses an air or electrically operated motor to drive the worm 19.

The method by which the above described apparatus is employed is as follows:

The two parts 1 and 2 are first secured about the pipeline 3 upon opposite sides thereof. These parts 1 and 2, as shown, are welded along weld lines W to each other as well as to the pipeline 3 in a manner ensuring that the resulting housing is fluid tight on the pipeline 3 except for the openings 4 and 4A. A slide valve housing 6 is then secured, for example by bolts, to the outwardly directed flange 5 of the opening 4.

The pressure tight housing 8, if not already secured to the slide valve housing 6, is now secured thereto coaxially with the opening 4 in the housing part 2, for example by bolting an end flange 8A of the pressure tight housing 8 to the slide valve housing.

Before the apparatus is put into operation the detachable portion 25 of the housing part 1 is secured to the flange 5A of the opening 4A in the housing part 1 and the bleed valve 29 is closed.

The pressure tight door 9 on the pressure tight housing 8 is now opened and a tubular shaped cutter 30, FIG. 1, is secured to the end of the shaft 15 for example by screw means passing through the cutter and into a head 15A on the end of the shaft. The door 9 is then closed and the slide valve in the housing 6 is opened. The driving means in the housing 27 is energised to rotate the shaft 15 and thus the cutter 30, and the cylinders 14 are then pressurised to move the rotating shaft 15 towards the pipeline 3. The rotating cutter 31 thus passes through the opening in the slide valve housing 6 and enters the opening 4 in the housing part 2. As the cutter presses against the pipeline 3 it cuts a hole first on one face and then on the other face of the pipeline 3. Alternatively if the diameter of the cutter 30 is greater than that of the pipeline 3 it cuts away a complete section of said pipeline. In the description that follows it will be assumed that a complete section has been cut away. The cutter 30 is hollow so that said cut away section may accumulate in the cutter 30. In the event that the pipeline 3 is horizontal and the apparatus for cutting the pipeline is vertically disposed above the pipeline 3 then the cut away section of the pipeline 3 may drop down into the detachable portion 25 of the housing 1, 2, as is shown, for example, by the cut away section 33 of the pipeline 3 illustrated in FIG. 3 as being accommodated in the detachable portion 25 of the housing.

When the pipeline 3 has been cut through by the cutter 30, for example as indicated by the setting of the radially extending arms 12 relatively to a scale 28 on the elongated member 10, the pressure applied to the piston and cylinder units 14 is reversed so as to withdraw the cutting tool 30 from the two part housing 1, 2 into the pressure tight housing 8. The slide valve 7 in the slide valve housing 6 is then closed before the pressure tight door 9 to the housing 8 is opened. The cutting tool 30 is then removed and replaced by a sizing tool secured to the shaft end 15A, for example, in a similar manner to the cutting tool 30.

The door 9 is then closed in a pressure tight manner, the slide valve 7 is opened and the shaft 15 with the sizing tool thereon is driven towards the cut away gap in the pipeline 3. When the cut edges 31 of the gap in the pipeline 3 have been sized the shaft 15 is withdrawn, the slide valve 7 is closed and the pressure tight door 9 is opened.

The sizing tool, that has not been shown, is then removed from the shaft 15 and replaced by a cylindrical valve sleeve 32, FIG. 3, that is secured in a releasable manner to the end of the axially displaceable sleeve 11. As shown the sleeve 11 has a flanged end 11A from which there projects, in a direction parallel to the longitudinal axis of the sleeve 11, a plurality of pins or studs 11B. The right hand end of the valve sleeve 32, as viewed in FIG. 3, has blind holes aligned with the pins or studs 11B such that the valve sleeve 32 can be pushed onto said pins or studs and held there frictionally. The apparatus is then as illustrated in FIG. 3, with the sliding valve 7 closed and the sized edges 31 in the pipeline 3 ready to receive the valve sleeve 32. The valve sleeve 32 has diametrically opposed ports 32A and the common axis of these two ports is arranged, by the co-operation of the pins or studs 11B with said blind holes in the sleeve 32, to be parallel to the longitudinal axis of the pipeline 3. With the pressure door 9 closed the slide valve 7 is opened and the axially displaceable sleeve 11 is driven by the piston and cylinder units 14 towards the pipeline 3. Since the axially displaceable sleeve 11 does not rotate, the valve sleeve 32 is thereby forced into the gap in the pipeline 3 such that the common polar axis of the opposed ports 32A in the valve sleeve 32 remains parallel with the polar axis of the pipeline 3. A flanged shoulder 32B on the valve sleeve 32 eventually abuts against a recessed shoulder 4C in the opening 4 of the housing part 2 to prevent further movement of the valve sleeve 32 into the pipeline 3. The setting of these shoulders 32B and 4C is so predetermined that the opposed ports 32A in the valve sleeve 32 are then aligned with the bore of the pipeline 3. The valve sleeve 32 is a force fit between the cut edges 31 and to facilitate the entry of the valve sleeve 32 into said gap the left hand end of the valve sleeve 32, as viewed in FIG. 3, may be slightly tapered or rounded.

Figure 4:
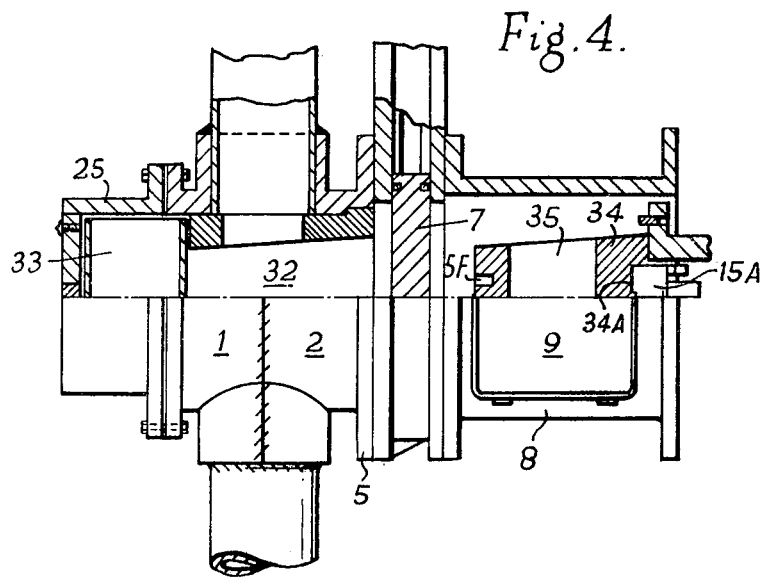
FIG. 4 is a sectional view similar to FIG. 3 but showing the valve sleeve in position in the pipeline and the apparatus on the housing ready for inserting a valve member in the valve sleeve.

The axially displaceable sleeve 11 is then withdrawn leaving the valve sleeve 32 wedged in the pipeline 3. The slide valve 7 is then closed and the pressure tight door 9 on the pressure tight housing 8 is opened. A tapered valve member 34, FIG. 4, is then mounted on the end of the shaft 15, the valve member 34 having a rectangular blind bore 34A into which extends a corresponding portion 15A on the shaft 15. The valve member 34 has a flow path 35 extending therethrough and the blind bore 34A and the shaft portion 15A co-operate in a manner ensuring that the longitudinal axis of this flow path is parallel to the longitudinal axis of the pipeline 3. The pressure tight door 9 is then closed and, thereafter, the slide valve 7 is opened. The shaft 15, that cannot slide relatively to the sleeve 11, is then urged forwardly by suitably energising the piston and cylinder units 14 to move the valve member 32. During this operation the shaft 15 is not rotated and, consequently, when the valve member 34 is pushed into the valve sleeve 32 the bore 35 and the valve member is aligned with the ports in the sleeve 32 and thus the flow of liquid or gas through the pipeline 3 continues in an unrestricted manner. FIG. 4 shows the valve member 34 mounted on the shaft 15 just prior to the opening of the valve 7 and before the valve 34 is forced into the valve sleeve 32.

Figure 5:
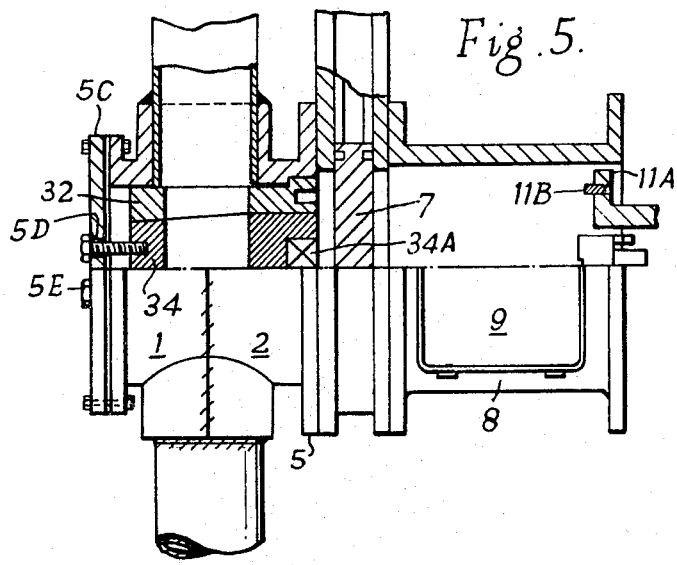
FIG. 5 is a sectional view similar to FIG. 3 but showing the detachable portion of the housing removed and replaced by a permanent closing plate having a screw member extending into the valve member to hold it temporarily in position whilst the slide valve secured to the housing is removed.

After the tapered valve member 34 has been pushed into the pipeline 3, and since the valve member 34 is shown to be of conical form, means must be provided, before the shaft 15 is withdrawn, to prevent the valve member from being forced to the right, as viewed in FIG. 5, out of the pipeline 3 by the unbalanced forces acting on the opposed left and right hand internal faces of the valve member 34. For this purpose the bleed valve 29 may first be opened to test whether the pipeline 3 has been effectively sealed by the sleeve 32 and the valve member 34 before the shaft 15 is withdrawn. Thereafter the detachable portion 25 of the housing part 1 is removed and with it the cut away part 33 of the pipeline 3. The exposed opening 4A is then closed by a permanent valve closing plate 5C bolted to the flange 5A of the housing part 1. The plate 5C has at least one hole 5D through which a threaded bolt or screw 5E is inserted and threaded into a correspondingly threaded or screwed blind bore 5F in the left hand end of the tapered valve member 34 as shown in FIG. 5. The bolt or screw 5E is then tightened up until its head engages the valve closing plate 5C to thus draw the valve member 34 firmly into the valve sleeve 32 in a manner holding it temporarily therein against removal. At a subsequent stage, described hereinafter, the one or more bolts or screws 5E are removed and replaced by sealing plugs or screws 5G, FIG. 6, screwed into the one or more holes 5D of the cover plate 5C in order to seal the plate 5C and leave the valve member 34 free for rotation within the valve sleeve 32.

The pressure medium operating the piston and cylinder units 14 is then reversed to withdraw the axially displaceable sleeve 11 and thus the shaft 15 away from the opening 4 and into the pressure tight housing 8. The slide valve 7 may then be closed although this is no longer necessary since the pipeline 3 is now sealed from the external surroundings by the presence of the valve sleeve 32 and the valve member 34. FIG. 5 shows the valve sleeve 32 and the valve member 34 held in position in the pipeline 3 by bolts 5E extending through the cover 5C, and with the shaft 15 withdrawn and the slide valve 7 closed.

It is within the scope of the present invention to eliminate or combine some of the steps detailed above. Thus for example should the cutting operation by the cutting tool 30 result in an aperture that is of a suitable degree of finish the sizing operation can be eliminated. Similarly, it is within the scope of the present invention to combine the separate operations of inserting first the valve sleeve 32 and then the valve member 34 by inserting the valve member 34 into the valve sleeve 32 prior to the insertion of the valve sleeve 32 into the pipeline 3.

Figure 6:
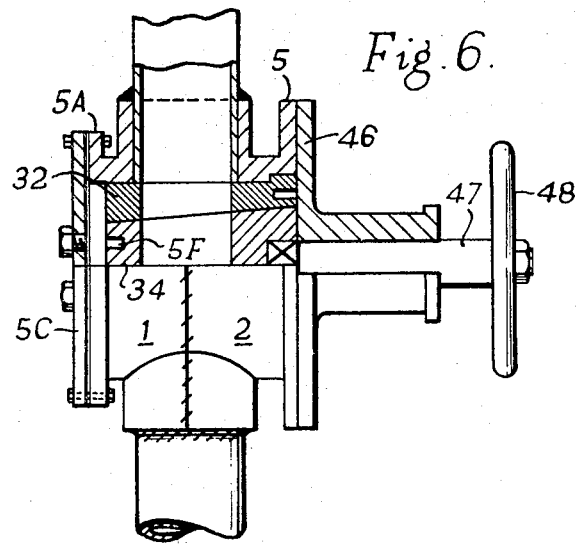
FIG. 6 is a part sectional view showing the completed valve assembly in position on a pipeline complete with valve operating means.

The pressure tight housing 8 and the slide valve housing 6 are then removed from the two part housing 1, 2 and valve operating means 46, 47, 48, FIG. 6, is then applied to the outwardly directed flange 5 of part 2 of the housing. As shown the valve operating means comprises a shaft 47 having a squared end extending into the squared blind bore 34A of the right hand end of the valve member 34, said shaft 47 extending through a sleeve having an enlarged flange 46 that can be bolted to the outwardly directed flange 5. An operating handle 48 is secured to the protruding end of the shaft 47.

Various modifications may be made to the above apparatus without affecting the method which comprises the present invention as defined in the appended claims. Thus for example the cylinder units 14 may be dispensed with and replaced by any other suitable means. As shown in FIG. 7 the elongated member 10 is provided with a pair of opposed lugs 49 between which is mounted a manually operated pinion wheel 50 meshing with a rack 51 formed on or secured to the sliding sleeve 11.

Although the drawings and FIGS. 1 to 7, are directed to a through-way valve, that is to say a one way valve, illustrating a method for inserting such a valve into a pipeline in which a liquid or gas is flowing, the invention is not limited to one way valves and can, in fact, be applied equally well to three-way and four-way valves. The insertion of such multi-way valves into existing pipelines enables tapping points to be inserted, where and when desired, in a pipeline system, without any shut down of the plant concerned.

A suitable form of three-way valve, as assembled and fitted on an existing pipeline, will now be described, by way of example only, it being understood that such a description will convey to those skilled in the art the manner in which a four-way valve can be assembled and fitted in a pipeline whilst a gas or liquid is flowing through said pipeline.

Referring now to FIGS. 8 and 9 it will be seen that a two part housing 1, 2 is again provided for fitment about a pipeline 3. The two housing portions 1 and 2, when assembled together and welded along the weld lines W, form a three-way housing, two of said three-ways being defined by two coaxial cylindrical arms 36, 37 extending from opposite ends of the housing in the direction of the pipeline 3, and the third of said three-ways being defined by a third cylindrical arm 38 extending at right angles to the other two.

The cylindrical arm 38 may terminate in a flanged end 39 to which is removably secured a pressure tight cover plate 40, or the flanged end of a pipeline (not shown).

The housing also has flanged ends 5 and 5A leading to openings 4 and 4A (not shown) similar to those described with reference to FIGS. 1 to 6 in order that the previously described slide valve 7 may be secured to the flanged end 5 and the previously described detachable portion 25 of the housing may be secured to the flanged end 5A.

The valve sleeve 32, as before, has a cylindrical exterior and an internal conical bore extending along its longitudinal axis. Radiating from the conical bore are three apertures 41, 42, 43, which, when the sleeve is being forced into the cut-away gap in the pipeline 3, by the above described method and apparatus, are so orientated with respect to the opposed cylindrical arms 36, 37 that the flow of gas or liquid through the pipeline 3 continues unimpeded, the apertures 41 and 42 being aligned with the arms 36 and 37 respectively, and with the aperture 43 aligned with the arm 38.

A valve member 34 is then forced into the sleeve 32, again by the above described method and apparatus, said valve member haing a T-shaped bore 35 therein that is capable of being aligned with the apertures 41, 42 and 43 in the sleeve 32. The valve member is inserted with the T-shaped bore 35 so disposed with respect to the apertures 41, 42, that the flow of gas or liquid through the pipeline 3 is not stopped by the insertion of the valve member.

The previously described method for temporarily securing the valve member 34 in position, whilst control means for rotating the valve member is applied to the housing, is then carried out.

It will be seen that a three-way valve assembly can thus be assembled in an existing pipeline without stopping the normal flow therethrough.

Although the cylindrical arm 38 is shown in FIG. 9 as terminating in a flanged end 38, it will be appreciated that such an end and the cover 40 can be dispensed with if a junction pipeline is inserted into the cylindrical arm 38 and welded thereto prior to the cutting of the main pipeline 3 within the housing.

By modifying the construction of the valve assemblies described above, additional flanges are included to enable the valve assemblies to be cut away from the pipelines, should this subsequently be desired, in a manner leaving flanged ends on said pipelines such that a flanged connecting pipeline can be secured therebetween.

To this end, each cylindrical arm of the valve assembly, for example arm 36 in FIG. 10, is provided with a flange 44 integral therewith and a further flange 45 bolted thereto. It will be appreciated that these end flanges 44 and 45 are all of split form initially in order that they can be assembled around the pipeline 3 at the time that the parts 1 and 2 are placed together about the pipeline 3. When the two parts 1 and 2 of the housing are welded together the flange halves 45 are welded together as well as to the pipeline 3. Thus, should it subsequently be desired that the valve should be removed from the pipeline 3 it is possible to perform a cutting operation between each flange 44 and its associated flange 45 to remove the whole of the two part housing 1, 2 from the pipeline 3. This operation will leave each cut end of the pipeline 3 with a flange 45 already secured thereto so that the gap between the flanges 45 can be filled by a further pipeline section terminating in flanges equivalent to the flanges 44, or replaced by another valve, say, at plant shut down.

For all small and medium sized units there would be no necessity for the pressure tight door 9. In such instances the whole of the pressure tight housing 8 and the equipment associated therewith can be removed from the slide valve housing 6 once the slide valve 7 has been closed. The removal of the cutter 30 and the replacement thereby of the subsequent items can be carried out without any difficulty being involved by operating through the door 9.

The cylindrical cutting tool 30 is provided with cutting teeth disposed around its leading lip and its walls are perforated to allow the contents of the pipeline to flow through it during its cutting operation through the pipeline. The cutter may also be provided with clips to retain displaced sections of the pipe that may enter therein.

A pressure gauge may be connected to the housing 1, 2 to indicate when the cutting tool has cut through the pipeline 3. In small operations any fluid trapped in the housing 1, 2 may be drained to waste. Large installations may be elaborated by the addition of a pump and suitable connections to pump this trapped fluid back into the valve casing on the pressure side or into a storage tank for later disposal.

The various sealing gaskets and bolts that are required to assemble the parts illustrated in the accompanying drawings in their associated liquid tight relationship have been omitted in nearly every instance in order to simplify the drawing, and although a tapered flow valve has been described with respect to the present invention it is also intended that the present invention shall include within its scope the use of flow valves other than tapered ones, for example parallel plug type, disc or wedge gate type, or ball types.

Also, whereas the two halves of the valve housing 1, 2 have been described as being welded together about the pipeline 3 it will be appreciated that they may be suitably flanged so that they may be bolted together about the pipeline with suitable packing seals therebetween and at the ends thereof.

What I claim is:

1. A method of inserting a flow control valve into a pipeline intermediate its ends whilst the pipeline is conveying a liquid or gas therethrough comprising applying a housing about a pipeline in a liquid tight manner, rotating a shaft to rotate a cutting tool within the housing so as to cut out sections of said pipeline, withdrawing the shaft and cutting tool from the housing into a pressure tight chamber secured to said housing, isolating the housing from the pressure chamber, removing the cutting tool from its operating shaft, placing a ported valve sleeve on said shaft such that two opposed ports in the valve sleeve are opposed in a direction that is parallel with the direction of liquid flow in the pipeline, establishing communication between the housing and the pressure tight chamber, using the shaft to force the valve sleeve into the pipeline so as to extend thereacross and occupy the cut away sections of the pipeline with the ports in the valve sleeve aligned with the bore of the pipeline, withdrawing the shaft into the pressure tight chamber whilst leaving the valve sleeve in position in the pipeline, isolating the housing from the pressure tight chamber, applying a valve member to the shaft, establishing communication between the pressure tight chamber and the housing and then operating said shaft to move the valve member past said slide valve and into the valve sleeve to seal the pipeline from the housing with the valve in a setting allowing fluid flow through said pipeline, causing a valve holding means to co-operate with the valve member in a manner temporarily holding said valve member against removal from the valve sleeve, removing the pressure tight chamber from the housing, securing a valve control device to the housing for operating the valve member, and then releasing said valve holding means.

2. A method as claimed in claim 1 including the step of sizing the cut portions of the pipe with a sizing cutter prior to the insertion of the valve sleeve, the proceedure of opening the pressure tight chamber only when the same is isolated being repeated whilst the sizing cutter is being fitted to and subsequently removed from the shaft.

3. A method as claimed in claim 1 and including the step of opening a door or cover to the pressure tight chamber each time access is to be made to said operating shaft therein for the purpose of removing a cutting tool therefrom, and for applying said valve sleeve or valve member thereto, the pressure tight chamber being isolated each time before said door is opened, once the pipeline has been cut through.

4. A method as claimed in claim 2 and including the step of opening a door or cover to the pressure tight chamber each time access is to be made to said operating shaft therein for the purpose of removing a cutting or sizing tool therefrom, the pressure tight chamber being isolated each time before said door is opened, once the pipeline has been cut through.

5. A method as claimed in claim 1 and including the step of temporarily removing the pressure tight chamber from said housing each time access is to be made to said operating shaft in the pressure tight chamber for the purpose of removing a cutting tool therefrom, and for applying said valve sleeve and valve member thereto, the housing being isolated each time before said pressure tight chamber is removed, once the pipeline has been cut through.

6. A method as claimed in claim 2 and including the step of temporarily removing the pressure tight housing from said slide valve member each time access is to be made to said operating shaft therein for the purpose of removing a cutting or sizing tool therefrom, and for applying said valve sleeve and valve member thereto, the housing being isolated each time before said pressure tight chamber is removed, once the pipeline has been cut through.

7. A method as claimed in claim 1 and wherein the valve member is held in said temporary manner against removal from said valve sleeve by removing a temporary cover on said housing at a point opposed to that through which the valve member has been inserted into the valve sleeve, replacing said temporary cover by a permanent cover having at least one aperture therein, passing a screwed bolt through said aperture into threaded engagement with a corresponding screw threaded blind bore in the valve member, and tightening up the bolt such that the head thereof engages the cover to hold the valve member against removal in the direction in which it was inserted.

8. A method as claimed in claim 7 and wherein when the temporary securing of the valve member is no longer required, the bolt is removed and the vacated hole in the permanent cover is plugged.

References Cited by the Examiner
UNITED STATES PATENTS

| | | | |
|---|---|---|---|
| 940,356 | 11/09 | Phelps | 77—41 |
| 1,743,338 | 1/30 | Field | 77—37 X |
| 1,989,768 | 2/35 | Nieman | 77—41 |
| 2,621,888 | 12/52 | Allen | 251—316 |
| 2,756,486 | 7/56 | Smith | 29—157 |
| 2,770,532 | 11/56 | Mason | 77—40 X |
| 2,870,629 | 1/59 | Willis | 77—40 X |
| 2,911,187 | 11/59 | Owsley | 251—316 |
| 3,104,456 | 9/63 | Powell | 29—157 |

WILLIAM W. DYER, Jr., *Primary Examiner.*

ISADOR WEIL, LEON PEAR, *Examiners.*